US012626988B2

(12) United States Patent (10) Patent No.: US 12,626,988 B2

Mogi et al. (45) Date of Patent: May 12, 2026

(54) BATTERY PACK

(71) Applicant: Prime Planet Energy & Solutions, Inc., Tokyo (JP)

(72) Inventors: Yuya Mogi, Kasai (JP); Satoru Matsuyama, Kasai (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 606 days.

(21) Appl. No.: 18/173,044

(22) Filed: Feb. 22, 2023

(65) Prior Publication Data

US 2023/0275304 A1 Aug. 31, 2023

(30) Foreign Application Priority Data

Feb. 25, 2022 (JP) ................................. 2022-028193

(51) Int. Cl.
H01M 50/242 (2021.01)
H01M 10/42 (2006.01)
H01M 50/204 (2021.01)

(52) U.S. Cl.
CPC ..... H01M 50/242 (2021.01); H01M 10/4207 (2013.01); H01M 50/204 (2021.01)

(58) Field of Classification Search
None
See application file for complete search history.

(56) References Cited

U.S. PATENT DOCUMENTS

2010/0167116 A1 7/2010 Okada
2011/0293973 A1 12/2011 Kim

| | | | |
|---|---|---|---|
| 2011/0294000 A1* | 12/2011 | Kim ..................... | H01M 50/271 |
| | | | 429/177 |
| 2012/0121956 A1 | 5/2012 | Park et al. | |
| 2019/0348654 A1 | 11/2019 | Kuruma et al. | |
| 2020/0127349 A1* | 4/2020 | Park .................... | H01M 50/209 |
| 2020/0365850 A1 | 11/2020 | Shinoda et al. | |
| 2021/0167445 A1 | 6/2021 | Becker et al. | |
| 2021/0184305 A1 | 6/2021 | Mahnig et al. | |
| 2021/0268886 A1 | 9/2021 | Nakamura et al. | |

FOREIGN PATENT DOCUMENTS

| | | |
|---|---|---|
| CN | 207651567 U | 7/2018 |
| CN | 112204808 A | 1/2021 |
| JP | H08-007860 A | 1/1996 |
| JP | 2008-166060 A | 7/2008 |
| JP | 2008-192447 A | 8/2008 |
| JP | 2011-249309 A | 12/2011 |

(Continued)

*Primary Examiner* — Wyatt P McConnell

(74) *Attorney, Agent, or Firm* — HAUPTMAN HAM, LLP

(57) ABSTRACT

A battery pack includes: a plurality of battery cells arranged side by side in a first direction, each of the plurality of battery cells including a plurality of electrode terminals disposed side by side in a second direction orthogonal to the first direction; and a case member that accommodates the plurality of battery cells, the case member including a side surface portion extending in a direction orthogonal to the first direction or in a direction orthogonal to the second direction and a reinforcing rib provided on the side surface portion. The reinforcing rib extends in a third direction orthogonal to the first direction and the second direction or in a direction obliquely intersecting the third direction.

10 Claims, 7 Drawing Sheets

(56)     References Cited

FOREIGN PATENT DOCUMENTS

| | | | |
|---|---|---|---|
| JP | 2012-101663 | A | 5/2012 |
| JP | 2012104467 | A | 5/2012 |
| JP | 2014-022151 | A | 2/2014 |
| JP | 2018-170100 | A | 11/2018 |
| JP | 2019197622 | A | 11/2019 |
| JP | 2020-187969 | A | 11/2020 |
| JP | 2021-022434 | A | 2/2021 |
| JP | 2021-093362 | A | 6/2021 |
| JP | 2021-138187 | A | 9/2021 |
| WO | 2016/175270 | A1 | 11/2016 |
| WO | 2022/006252 | A1 | 1/2022 |

* cited by examiner

FIG.13
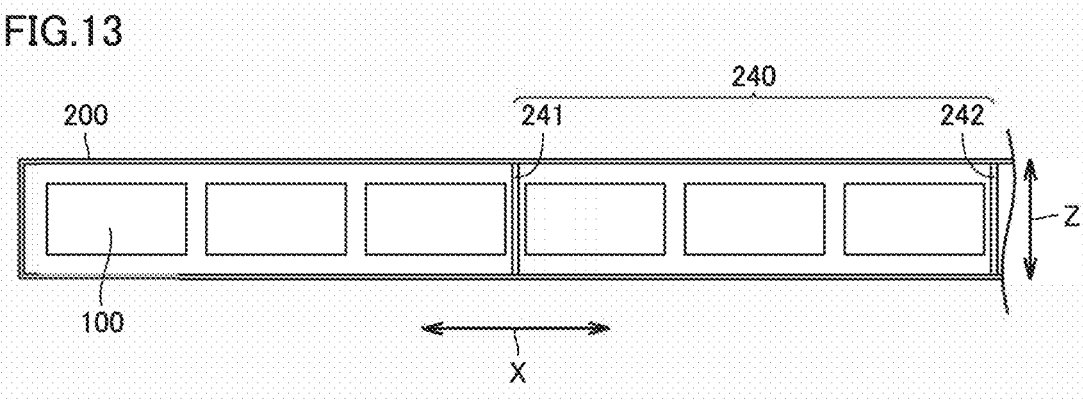
FIG.14
FIG.15
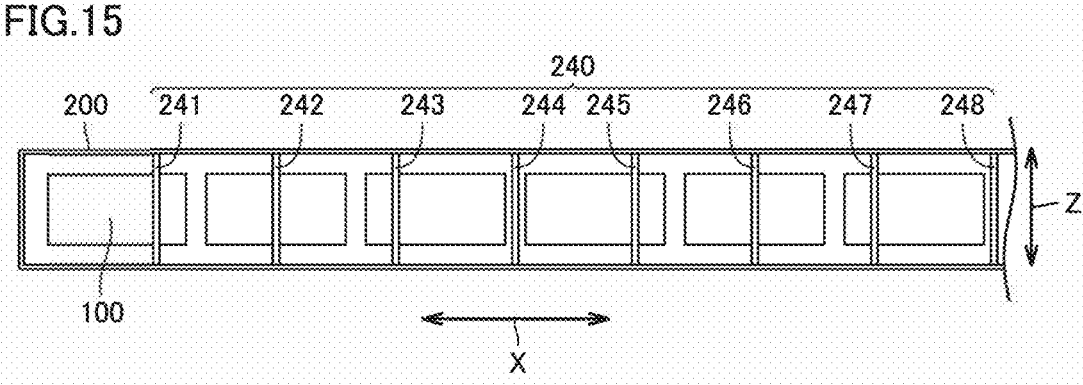

BATTERY PACK

This nonprovisional application is based on Japanese Patent Application No. 2022-028193 filed on Feb. 25, 2022 with the Japan Patent Office, the entire contents of which are hereby incorporated by reference.

BACKGROUND OF THE INVENTION

Field of the Invention

The present technology relates to a battery pack.

Description of the Background Art

There has been conventionally known a battery pack having a case member in which a plurality of battery cells are accommodated. For example, Japanese Patent Laying-Open No. 2019-197622 illustrates a battery pack having a case in which a battery stack constituted of cells each having a discharge valve is accommodated. Further, Japanese Patent Laying-Open No. 2012-104467 discloses a structure in which a reinforcing rib surrounds a side surface of a battery pack in a lateral direction.

SUMMARY OF THE INVENTION

When expansion force of a battery cell becomes large, an amount of deformation and generated stress of the case member also tend to be large. Use of a material having a large allowable stress (for example, a high-tensile steel plate or the like) to improve a load capacity is a factor for increased cost. From a viewpoint of suppressing the amount of deformation and generated stress of the case member due to the expansion force of the battery cell, there is still room for improvement in the conventional battery pack.

An object of the present technology is to provide a battery pack to effectively receive expansion force of a battery cell and reduce amount of deformation and generated stress of a case member.

A battery pack according to the present technology includes: a plurality of battery cells arranged side by side in a first direction, each of the plurality of battery cells including a plurality of electrode terminals disposed side by side in a second direction orthogonal to the first direction; and a case member that accommodates the plurality of battery cells, the case member including a side surface portion extending in a direction orthogonal to the first direction or in a direction orthogonal to the second direction and a reinforcing rib provided on the side surface portion. The reinforcing rib extends in a third direction orthogonal to the first direction and the second direction or in a direction obliquely intersecting the third direction.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 13 is an eighth diagram showing an exemplary reinforcing rib arrangement.

FIG. 14 is a ninth diagram showing an exemplary reinforcing rib arrangement.

FIG. 15 is a tenth diagram showing an exemplary reinforcing rib arrangement.

DESCRIPTION OF THE PREFERRED EMBODIMENTS

Figures 1, 2:
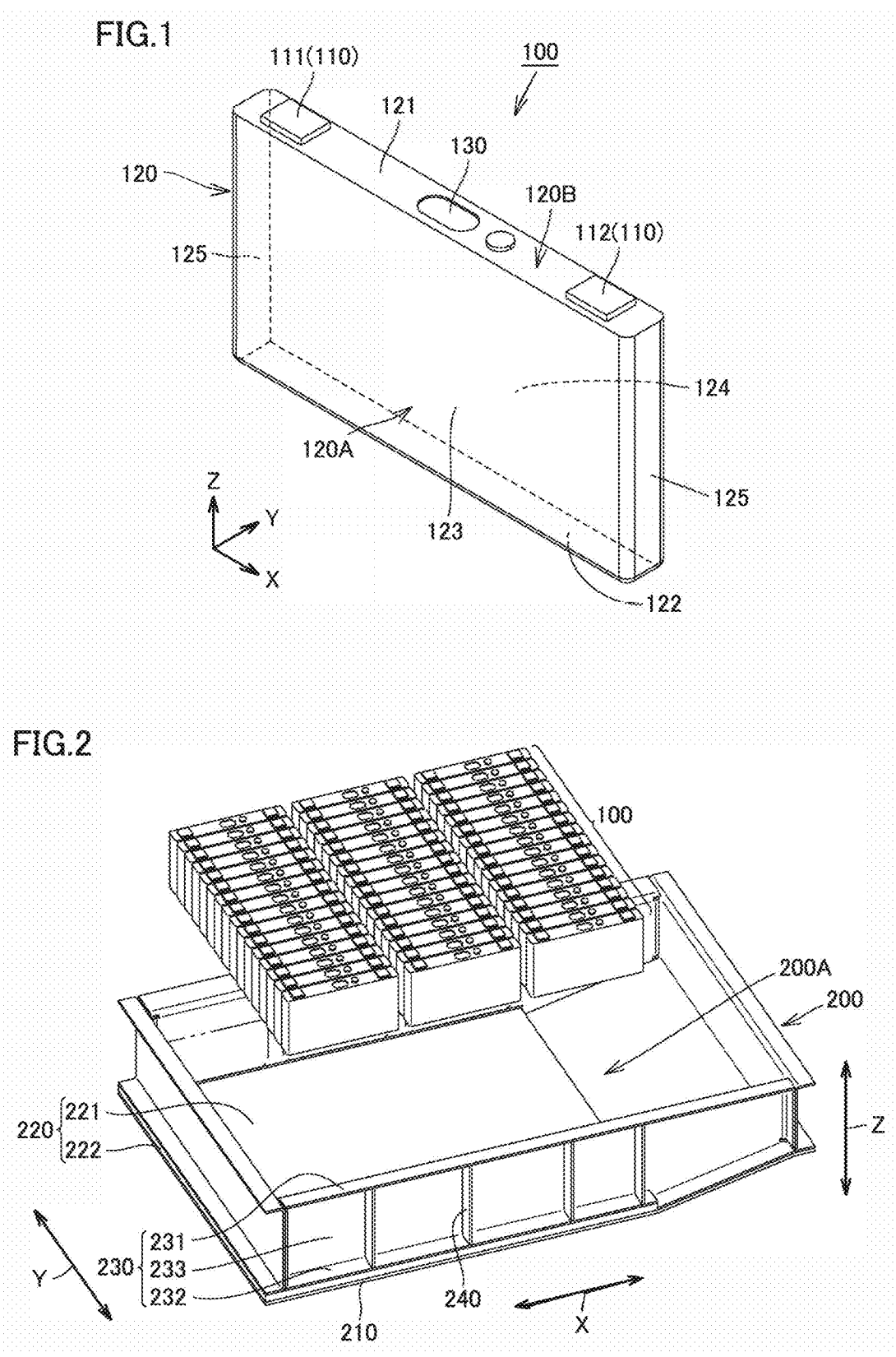
FIG. 1 is a perspective view showing a battery cell.
FIG. 2 is a perspective view showing battery cells and a case member (except for a cover member) that accommodates the battery cells.

Hereinafter, embodiments of the present technology will be described. It should be noted that the same or corresponding portions are denoted by the same reference characters, and may not be described repeatedly.

It should be noted that in the embodiments described below, when reference is made to number, amount, and the like, the scope of the present technology is not necessarily limited to the number, amount, and the like unless otherwise stated particularly. Further, in the embodiments described below, each component is not necessarily essential to the present technology unless otherwise stated particularly. Further, the present technology is not limited to one that necessarily exhibits all the functions and effects stated in the present embodiment.

It should be noted that in the present specification, the terms "comprise", "include", and "have" are open-end terms. That is, when a certain configuration is included, a configuration other than the foregoing configuration may or may not be included.

Also, in the present specification, when geometric terms and terms representing positional/directional relations are used, for example, when terms such as "parallel", "orthogonal", "obliquely at 450", "coaxial", and "along" are used, these terms permit manufacturing errors or slight fluctuations. In the present specification, when terms representing relative positional relations such as "upper side" and "lower side" are used, each of these terms is used to indicate a relative positional relation in one state, and the relative positional relation may be reversed or turned at any angle in accordance with an installation direction of each mechanism (for example, the entire mechanism is reversed upside down).

In the present specification, the term "battery" is not limited to a lithium ion battery, and may include other batteries such as a nickel-metal hydride battery and a sodium ion battery.

In the present specification, the term "battery cell" is not necessarily limited to a prismatic battery cell and may include a cell having another shape, such as a cylindrical battery cell, a pouch battery cell, or a blade battery cell. The "battery cell" can be mounted on vehicles such as a hybrid electric vehicle (HEV), a plug-in hybrid electric vehicle (PHEV), and a battery electric vehicle (BEV). It should be noted that the use of the "battery cell" is not limited to the use in a vehicle.

FIG. 1 is a perspective view showing a battery cell 100. As shown in FIG. 1, battery cell 100 has a prismatic shape. Battery cell 100 has electrode terminals 110, a housing 120, and a gas-discharge valve 130.

Electrode terminals 110 are formed on housing 120. Electrode terminals 110 have a positive electrode terminal 111 and a negative electrode terminal 112 arranged side by side along an X axis direction (second direction) orthogonal to a Y axis direction (first direction). Positive electrode terminal 111 and negative electrode terminal 112 are provided to be separated from each other in the X axis direction.

Housing 120 has a rectangular parallelepiped shape and forms an external appearance of battery cell 100. Housing 120 includes: a case body 120A that accommodates an electrode assembly (not shown) and an electrolyte solution (not shown); and a sealing plate 120B that seals an opening of case body 120A. Sealing plate 120B is joined to case body 120A by welding.

Housing 120 has an upper surface 121, a lower surface 122, a first side surface 123, a second side surface 124, and two third side surfaces 125.

Upper surface 121 is a flat surface orthogonal to a Z axis direction (third direction) orthogonal to the Y axis direction and the X axis direction. Electrode terminals 110 are disposed on upper surface 121. Lower surface 122 faces upper surface 121 along the Z axis direction.

Each of first side surface 123 and second side surface 124 is constituted of a flat surface orthogonal to the Y axis direction. Each of first side surface 123 and second side surface 124 has the largest area among the areas of the plurality of side surfaces of housing 120. Each of first side surface 123 and second side surface 124 has a rectangular shape when viewed in the Y axis direction. Each of first side surface 123 and second side surface 124 has a rectangular shape in which the X axis direction corresponds to the long-side direction and the Z axis direction corresponds to the short-side direction when viewed in the Y axis direction.

A plurality of battery cells 100 are stacked such that first side surfaces 123 of battery cells 100, 100 adjacent to each other in the Y direction face each other and second side surfaces 124 of battery cells 100, 100 adjacent to each other in the Y axis direction face each other. Thus, positive electrode terminals 111 and negative electrode terminals 112 are alternately arranged in the Y axis direction in which the plurality of battery cells 100 are stacked.

Gas-discharge valve 130 is provided in upper surface 121. When the temperature of battery cell 100 is increased (thermal runaway) and internal pressure of housing 120 becomes more than or equal to a predetermined value due to gas generated inside housing 120, gas-discharge valve 130 discharges the gas to outside of housing 120.

Figures 3, 4:
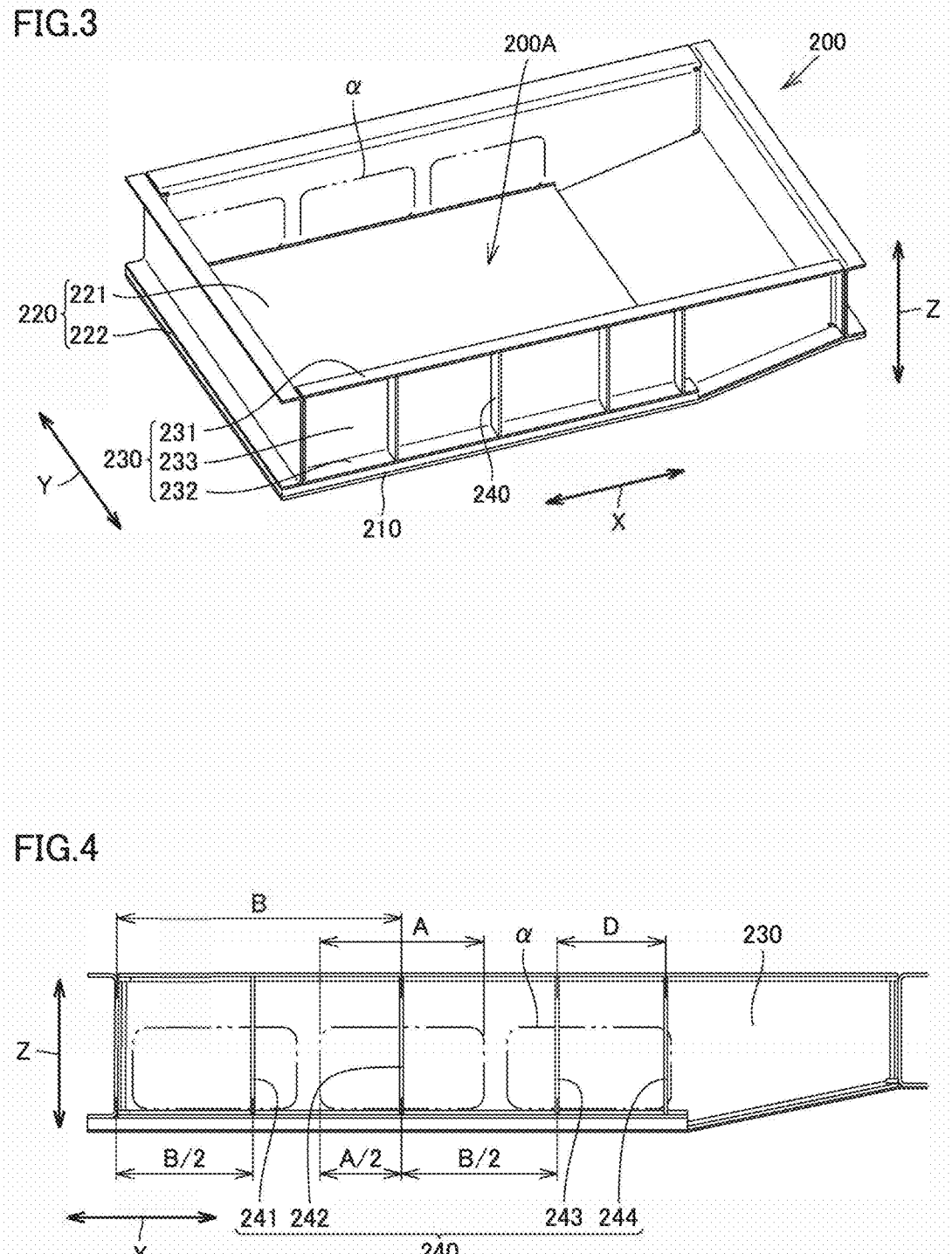
FIG. 3 is a perspective view showing the case member (except for the cover portion) of a battery pack.
FIG. 4 is a side view of the case member.

Each of FIGS. 2 and 3 is a perspective view showing case member 200 that accommodates battery cells 100. In each of FIGS. 2 and 3, for convenience of illustration, a below-described cover portion of case member 200 is not shown.

As shown in FIGS. 2 and 3, case member 200 includes an inner space 200A, a bottom surface member 210, a cooling plate 220, side surface members 230, and reinforcing ribs 240.

Stacks (battery assemblies) of the plurality of battery cells 100 stacked in the Y axis direction are accommodated in inner space 200A. The battery assemblies are arranged in three rows in the X axis direction. Cooling plate 220 and side surface members 230 define inner space 200A.

Bottom surface member 210 and cooling plate 220 constitute a bottom portion of case member 200. Cooling plate 220 is provided on bottom surface member 210. Cooling plate 220 includes: a first portion 221 facing inner space 200A; and a second portion 222 located on an outer side with respect to first portion 221 and not facing inner space 200A.

Each of side surface members 230 includes an upper flange portion 231 (first flange), a lower flange portion 232 (second flange), and a side surface portion 233 (frame portion). Second portion 222 of cooling plate 220 is interposed between lower flange portion 232 of side surface member 230 and bottom surface member 210. Side surface portion 233 of side surface member 230 constitutes a side surface of case member 200. Side surface portions 233 include: a portion extending in a direction orthogonal to the Y axis direction; and a portion extending in a direction orthogonal to the X axis direction. Side surface portion 233 connects upper flange portion 231 and lower flange portion 232. Upper flange portion 231 (first flange), lower flange portion 232 (second flange), and side surface portion 233 (frame portion) constitute a U-shaped cross section. Side surface portions 233, which are located on both sides in the Y axis direction with respect to the stacks (including separators) of battery cells 100 and extend in the direction orthogonal to the Y axis direction, directly support the stacks of battery cells 100 (Cell-to-Pack structure). At portions ca of side surface portions 233 in FIG. 3, the stacks of battery cells 100 are in abutment with side surface portions 233.

It should be noted that case member 200 is not limited to one in which side surface portions 233 directly support the stacks of battery cells 100, and may be one (Cell-Module-Pack structure) in which a battery module including the plurality of battery cells 100 is accommodated.

Reinforcing ribs 240 are provided on each of side surface portions 233 extending in a direction orthogonal to the Y axis direction. Reinforcing ribs 240 may be provided on each of side surface portions 233 extending in a direction orthogonal to the X axis direction. Reinforcing ribs 240 are provided to extend in the Z axis direction. Reinforcing ribs 240 may be provided to extend in a direction obliquely intersecting the Z axis direction.

On side surface portion 233 extending in the direction orthogonal to the Y axis direction, the plurality of reinforcing ribs 240 are provided side by side in the X axis direction. One reinforcing rib 240 may be provided.

Each of reinforcing ribs 240 extends across a whole of side surface portion 233 in the Z axis direction. Reinforcing rib 240 may be provided to extend across a portion thereof in the Z axis direction.

Lower flange portion 232 is in abutment with second portion 222 of cooling plate 220. Upper flange portion 231 is formed at an upper end portion of side surface member 230, i.e., an end portion opposite to cooling plate 220 in the Z axis direction. Upper flange portion 231 is formed to be separated from second portion 222 of cooling plate 220 and lower flange portion 232 along the Z axis direction and is formed in parallel with second portion 222 and lower flange portion 232. Upper flange portion 231 protrudes with respect to side surface portion 233 in the same direction as those of second portion 222 of cooling plate 220 and lower flange portion 232. Second portion 222 of cooling plate 220 protrudes on an outer side with respect to side surface portion 233 of side surface member 230.

Reinforcing rib 240 is formed to extend from upper flange portion 231 to reach lower flange portion 232. Reinforcing rib 240 may be composed of the same material as a material of side surface member 230, or may be composed of a material different from the material of side surface member 230. Reinforcing rib 240 may be composed of, for example, a steel plate, aluminum, or resin. Reinforcing ribs 240 are joined to upper flange portion 231, side surface portion 233, and lower flange portion 232. This joining is performed by welding or the like, for example. Preferably, all the portions at which reinforcing ribs 240 and side surface member 230 face one another are welded.

FIG. 4 is a side view of case member 200. As shown in FIG. 4, reinforcing ribs 240 include a first rib 241, a second rib 242, a third rib 243, and a fourth rib 244. First rib 241, second rib 242, third rib 243, and fourth rib 244 are provided to be separated from one another along the X axis direction.

Second rib 242 is provided on the central axis of the stack of battery cells 100 located at the center of the three rows in the X axis direction. Second rib 242 is arranged to be separated by a distance B from side surface portion 233 on the left side in FIG. 4 (reference side surface in the reinforcing rib arrangement). Second rib 242 is located on the central axis of battery cells 100 located at the center of the three rows.

First rib 241 is arranged to be separated by a distance B/2 from side surface portion 233 on the left side in FIG. 4. First rib 241 is provided at a position that corresponds to the stack of battery cells 100 located on the left side among the three rows in the figure and that is separated from the central axis of battery cells 100.

Third rib 243 is arranged to be separated from second rib 242 by distance B/2. Third rib 243 is provided at a position that corresponds to the stack of battery cells 100 located on the right side among the three rows in the figure and that is separated from the central axis of battery cells 100.

Fourth rib 244 is arranged to be separated from third rib 243 by a distance D. Distance D is different from distance B/2. Fourth rib 244 is provided at a position separated from the central axis of battery cells 100. Preferably, fourth rib 244 is arranged along an edge end or vicinity of the edge end of portion a (rightmost portion a of three portions a shown in FIG. 4) with which the stack of battery cells 100 separated the most from side surface portion 233 on the left side in FIG. 4 (reference side surface in the reinforcing rib arrangement) is in abutment, the edge end being located on a side far away from the reference side surface (right side in FIG. 4).

Figures 5, 6:
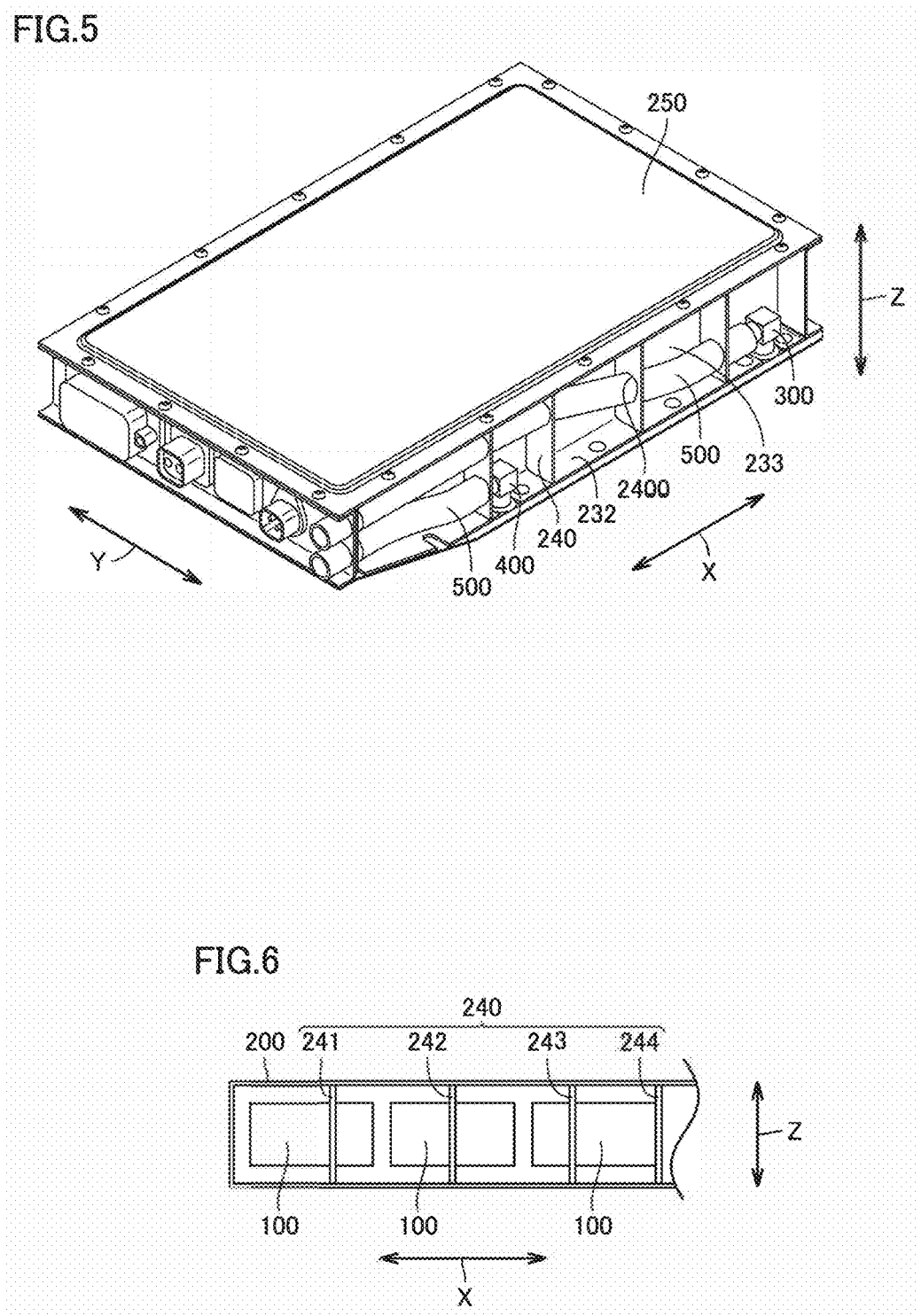
FIG. 5 is an external view of the battery pack.
FIG. 6 is a first diagram showing an exemplary reinforcing rib arrangement.

FIG. 5 is an external view of the battery pack. As shown in FIG. 5, a cover member 250 is assembled to side surface members 230 to seal inner space 200A of case member 200. The battery pack includes an entrance portion 300, an exit portion 400, and a coolant tube 500. Coolant is supplied from entrance portion 300 through coolant tube 500 to a coolant path formed in cooling plate 220, and the coolant is discharged from exit portion 400 through coolant tube 500. Water is used as the coolant, but the coolant is not limited thereto.

Coolant tube 500 is provided to extend along side surface portion 233. Coolant tube 500 is supported by a supporting portion 2400 provided in reinforcing rib 240. Supporting portion 2400 may be constituted of a through hole provided in reinforcing rib 240.

Each of FIGS. 6 to 15 shows an exemplary reinforcing rib arrangement 240. In the example shown in FIG. 6, as with the example shown in FIGS. 2 to 5, a first rib 241, a second rib 242, a third rib 243, and a fourth rib 244 are arranged for three rows of stacks of battery cells 100.

Figures 7, 8, 9:
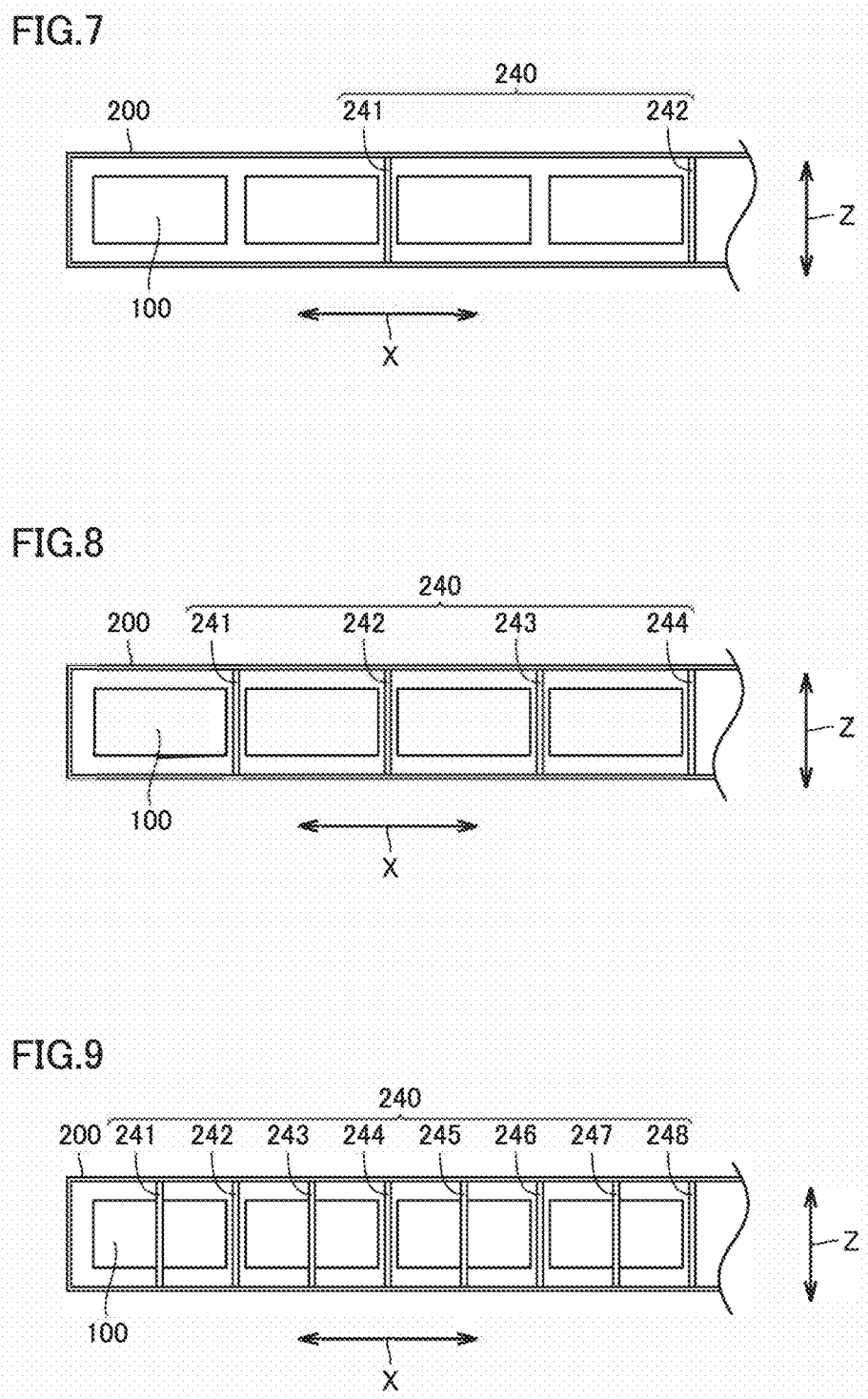
FIG. 7 is a second diagram showing an exemplary reinforcing rib arrangement.
FIG. 8 is a third diagram showing an exemplary reinforcing rib arrangement.
FIG. 9 is a fourth diagram showing an exemplary reinforcing rib arrangement.

In each of the examples shown in FIGS. 7 to 9, four rows of stacks of battery cells 100 are provided. In the example of FIG. 7, a first rib 241 and a second rib 242 are arranged at positions to avoid battery cells 100. In the example of FIG. 8, a first rib 241, a second rib 242, a third rib 243, and a fourth rib 244 are arranged at positions to avoid battery cells 100. In the example of FIG. 9, a first rib 241, a third rib 243, a fifth rib 245, and a seventh rib 247 are arranged on central axes of battery cells 100, and a second rib 242, a fourth rib 244, a sixth rib 246, and an eighth rib 248 are arranged at positions to avoid battery cells 100.

Figure 10:
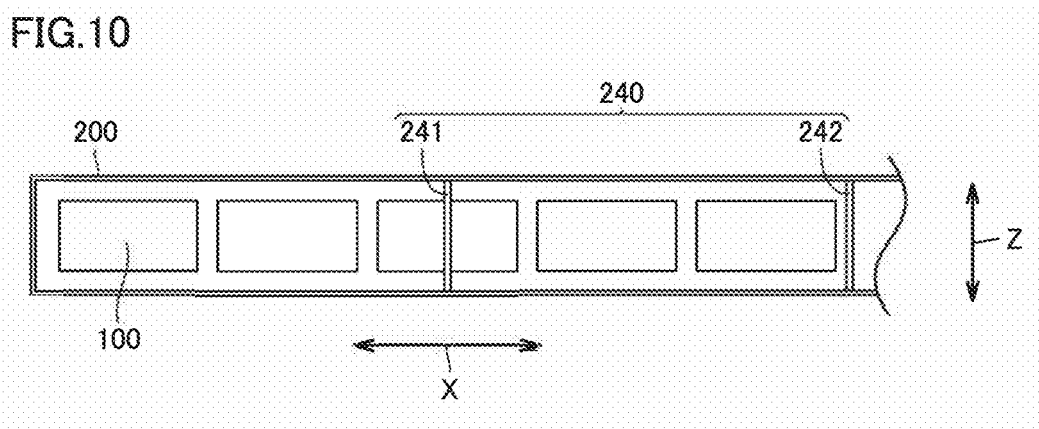
FIG. 10 is a fifth diagram showing an exemplary reinforcing rib arrangement.
Figure 11:
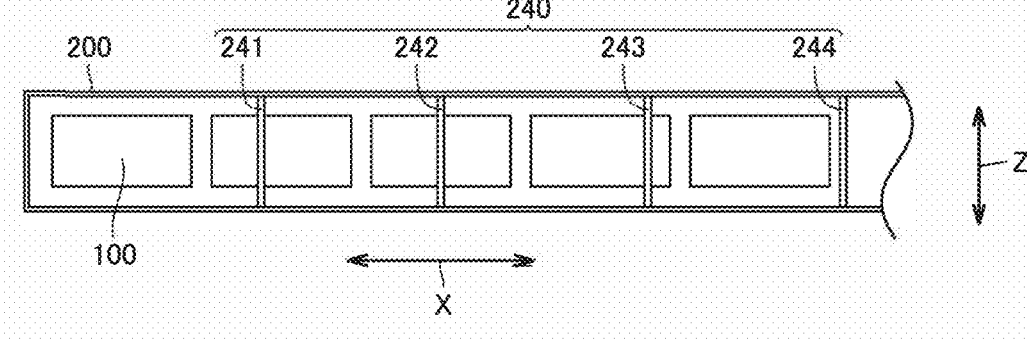
FIG. 11 is a sixth diagram showing an exemplary reinforcing rib arrangement.
Figure 12:
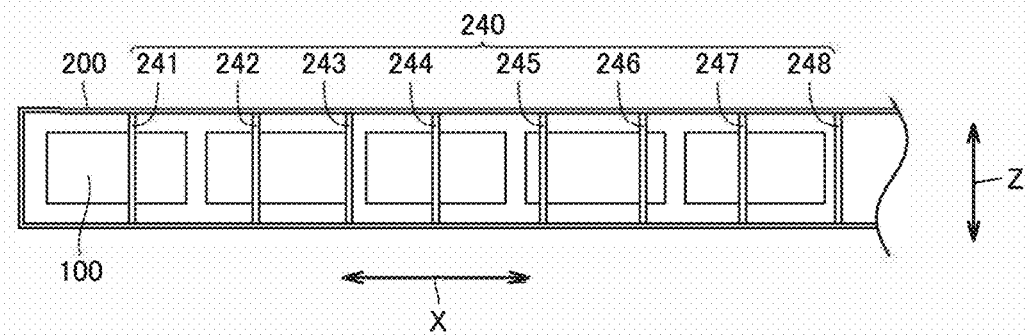
FIG. 12 is a seventh diagram showing an exemplary reinforcing rib arrangement.

In each of the examples shown in FIGS. 10 to 12, five rows of stacks of battery cells 100 are provided. In the example of FIG. 10, a first rib 241 is arranged on a central axis of battery cells 100, and a second rib 242 is arranged at a position to avoid battery cells 100. In the example of FIG. 11, a second rib 242 is arranged on a central axis of battery cells 100, a first rib 241 and a third rib 243 are arranged at positions that correspond to battery cells 100 and that are separated from the central axes of battery cells 100, and a fourth rib 244 is arranged at a position to avoid battery cells 100. In the example of FIG. 12, a fourth rib 244 is arranged on a central axis of battery cells 100, a first rib 241, a second rib 242, a fifth rib 245, a sixth rib 246, and a seventh rib 247 are arranged at positions that correspond to battery cells 100 and that are separated from the central axes of battery cells 100, and a third rib 243 and an eighth rib 248 are arranged at positions to avoid battery cells 100.

In each of the examples shown in FIGS. 13 to 15, six rows of stacks of battery cells 100 are provided. In the example of FIG. 13, a first rib 241 and a second rib 242 are arranged at positions to avoid battery cells 100. In the example of FIG. 14, a first rib 241 and a third rib 243 are arranged on central axes of battery cells 100, and a second rib 242 and a fourth rib 244 are arranged at positions to avoid battery cells 100. In the example of FIG. 15, a second rib 242 and a sixth rib 246 are arranged on central axes of battery cells 100, a first rib 241, a third rib 243, a fifth rib 245, and a seventh rib 247 are arranged at positions that correspond to battery cells 100 and that are separated from the central axes of battery cells 100, and a fourth rib 244 and an eighth rib 248 are arranged at positions to avoid battery cells 100.

Thus, depending on the number of the rows of the stacks of battery cells 100 (whether the number is an even number or an odd number; when the number is an even number, whether a value obtained by dividing the number by two is an even number or an odd number) and the number (appropriately changeable) of reinforcing ribs 240, all reinforcing ribs 240 may be arranged at positions other than the center of the pressure receiving surface (the central axis of battery cells 100 in the X axis direction), or part of reinforcing ribs 240 may be arranged at position(s) other than the center of the pressure receiving surface. In each of these cases, the inventors of the present application have confirmed that as compared with a case where reinforcing rib 240 is disposed only at the center of the pressure receiving surface, the expansion force of battery cell 100 in the Y axis direction can be effectively and uniformly received and an amount of deformation and generated stress of side surface portion 233 of case member 200 can be reduced.

Preferably, the plurality of reinforcing ribs 240 are sequentially arranged side by side from the reference side surface in the reinforcing rib arrangement at intervals each corresponding to the reinforcing rib arrangement distance (B/2), which is a distance that is ½ (or an inverse of an integer such as ¼ or ⅛) time as large as the reference distance (B) that is a distance between the central axis of the plurality of rows of the stacks of battery cells 100 in the X axis direction in case member 200 and side surface portion 233 (reference side surface in the reinforcing rib arrangement) of case member 200 along the Y axis direction. More preferably, reinforcing rib 240 is arranged along the edge end or vicinity of the edge end of portion a with which the stack of battery cells 100 furthest away from the reference side surface in the reinforcing rib arrangement is in abutment, the edge end being located on the side far away from the reference side surface.

Figures 16, 17:
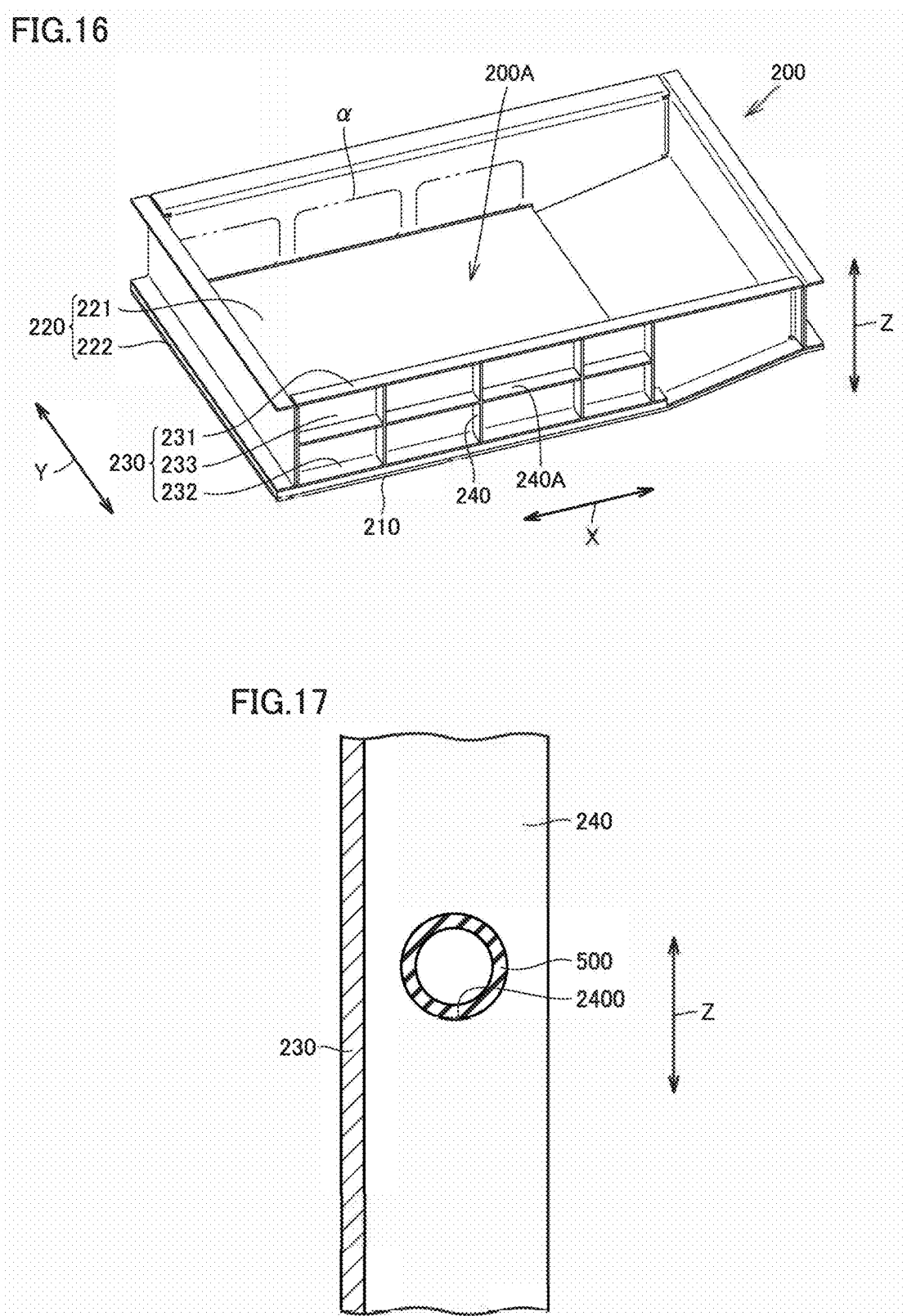
FIG. 16 is a perspective view showing a modification of the case member (except for the cover portion) of the battery pack.
FIG. 17 is an enlarged view of a supporting portion for a coolant tube.

FIG. 16 is a perspective view showing a modification of case member 200 (except for cover member 250). As shown in FIG. 16, in addition to reinforcing ribs 240 extending in the Z axis direction, a reinforcing rib 240A extending in the X axis direction (or the Y axis direction) may be provided. Further, in addition to reinforcing ribs extending in a direction inclined obliquely with respect to the Z axis direction, a reinforcing rib 240A extending in the X axis direction (or the Y axis direction) may be provided.

By adding reinforcing rib 240A, the amount of deformation of side surface portion 233 of case member 200 can be more effectively suppressed. Further, the structures and arrangements of reinforcing ribs 240 are not necessarily limited to those described above. For example, the plurality of reinforcing ribs 240 may be arranged at equal intervals, or the plurality of reinforcing ribs 240 may be arranged at different intervals.

FIG. 17 is an enlarged view of supporting portion 2400 for coolant tube 500. In the example of FIG. 17, supporting portion 2400 is constituted of a substantially circular through hole provided in reinforcing rib 240. The shape of the through hole can be appropriately changed. A cushion material may be provided at a contact portion between supporting portion 2400 and coolant tube 500.

Although the embodiments of the present invention have been described and illustrated in detail, it is clearly understood that the same is by way of illustration and example only and is not to be taken by way of limitation, the scope of the present invention being interpreted by the terms of the appended claims. The scope of the present invention is defined by the terms of the claims, and is intended to include any modifications within the scope and meaning equivalent to the terms of the claims.

What is claimed is:

1. A battery pack, comprising:
a plurality of stacks, each of the plurality of stacks including
a plurality of battery cells arranged side by side in a first direction, each of the plurality of battery cells including a plurality of electrode terminals disposed side by side in a second direction orthogonal to the first direction, and
separators; and
a case member including
a sealed inner space that accommodates the plurality of stacks, a side surface portion extending in a direction orthogonal to the first direction or in a direction orthogonal to the second direction, and
a reinforcing rib provided on the side surface portion, wherein
the reinforcing rib extends in a third direction orthogonal to the first direction and the second direction or in a direction obliquely intersecting the third direction,
the plurality of stacks is arranged in the second direction and in direct abutment with the side surface portion,
the side surface portion includes a pair of side surfaces located on both sides of the plurality of stacks in the first direction, respectively,
the reinforcing rib is provided on an outer side of each of the pair of side surfaces, the outer side facing away from the sealed inner space,
the pair of side surfaces defines the sealed inner space and directly supports the plurality of stacks in the first direction,
the case member includes a first flange and a second flange, each of the first flange and the second flange protruding with respect to the side surface portion in the first direction and extending in the second direction,
the first flange and the second flange are separated from each other along the third direction, and
the reinforcing rib extends from the first flange to reach the second flange.

2. The battery pack according to claim 1, wherein
the reinforcing rib extends across a whole of the side surface portion of the case member in the third direction.

3. The battery pack according to claim 1, wherein
the reinforcing rib is joined to each of the first flange and the second flange.

4. The battery pack according to claim 1, wherein
the reinforcing rib is provided at a position separated from a central axis of the plurality of battery cells in the second direction.

5. The battery pack according to claim 1, wherein
the reinforcing rib extends across a whole of the side surface portion of the case member in the third direction, and
the reinforcing rib is provided at a position separated from a central axis of the plurality of battery cells in the second direction.

6. The battery pack according to claim 1, wherein
the reinforcing rib is composed of a material same as a material of the side surface portion of the case member.

7. The battery pack according to claim 1, wherein
the reinforcing rib extends across a whole of the side surface portion of the case member in the third direction, and
the reinforcing rib is composed of a material same as a material of the side surface portion of the case member.

8. The battery pack according to claim 1, further comprising:
a cooling plate including a coolant path; and
a coolant tube that communicates with the coolant path of the cooling plate, wherein
the reinforcing rib includes a supporting portion that supports the coolant tube.

9. The battery pack according to claim 1, further comprising:
a plurality of reinforcing ribs including the reinforcing rib, wherein each of the plurality of reinforcing ribs extends across an entirety of the side surface portion of the case member in the third direction.

10. The battery pack according to claim 9, wherein each of the plurality of reinforcing ribs is at a position to avoid overlapping the plurality of battery cells of the plurality of stacks in the first direction.

\*   \*   \*   \*   \*